US007302018B2

(12) United States Patent
Onggosanusi et al.

(10) Patent No.: US 7,302,018 B2
(45) Date of Patent: Nov. 27, 2007

(54) ITERATIVE DETECTION IN MIMO SYSTEMS

(75) Inventors: Eko N. Onggosanusi, Allen, TX (US); Srinath Hosur, Plano, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 726 days.

(21) Appl. No.: 10/447,978

(22) Filed: May 29, 2003

(65) Prior Publication Data

US 2004/0242179 A1 Dec. 2, 2004

(51) Int. Cl.
*H04L 27/06* (2006.01)

(52) U.S. Cl. .................. 375/340; 375/144; 375/148

(58) Field of Classification Search ................ 375/130, 375/139, 147, 148, 316, 340, 346, 132, 136, 375/144; 329/318, 319, 320, 347, 349
See application file for complete search history.

(56) References Cited

U.S. PATENT DOCUMENTS

| 6,724,809 B2 * | 4/2004 | Reznik .................. 375/148 |
| 2004/0013212 A1 * | 1/2004 | Benesty et al. ............ 375/347 |

* cited by examiner

*Primary Examiner*—Jay K. Patel
*Assistant Examiner*—Naheed Ejaz
(74) *Attorney, Agent, or Firm*—Ronald O. Neerings; Wade James Brady, III; Frederick J Telecky, Jr.

(57) ABSTRACT

Iterative detection for a MIMO (multiple-input, multiple-output) wireless communications system uses multiple stages for interference cancellation refinements. Detection is determined by maximizing signal to noise plus interference ratios. Equalization matrix updating uses a matrix-inversion-free recursion. For P transmitter antennas and Q receiver antennas, the soft symbol vector estimates are $z = Fr - Gs^{hard}$ with F a P×Q IMMSE detector, r the received Q vector, and G a P×P interference canceller with $s^{hard}$ hard decisions of prior symbols and iterations.

20 Claims, 5 Drawing Sheets

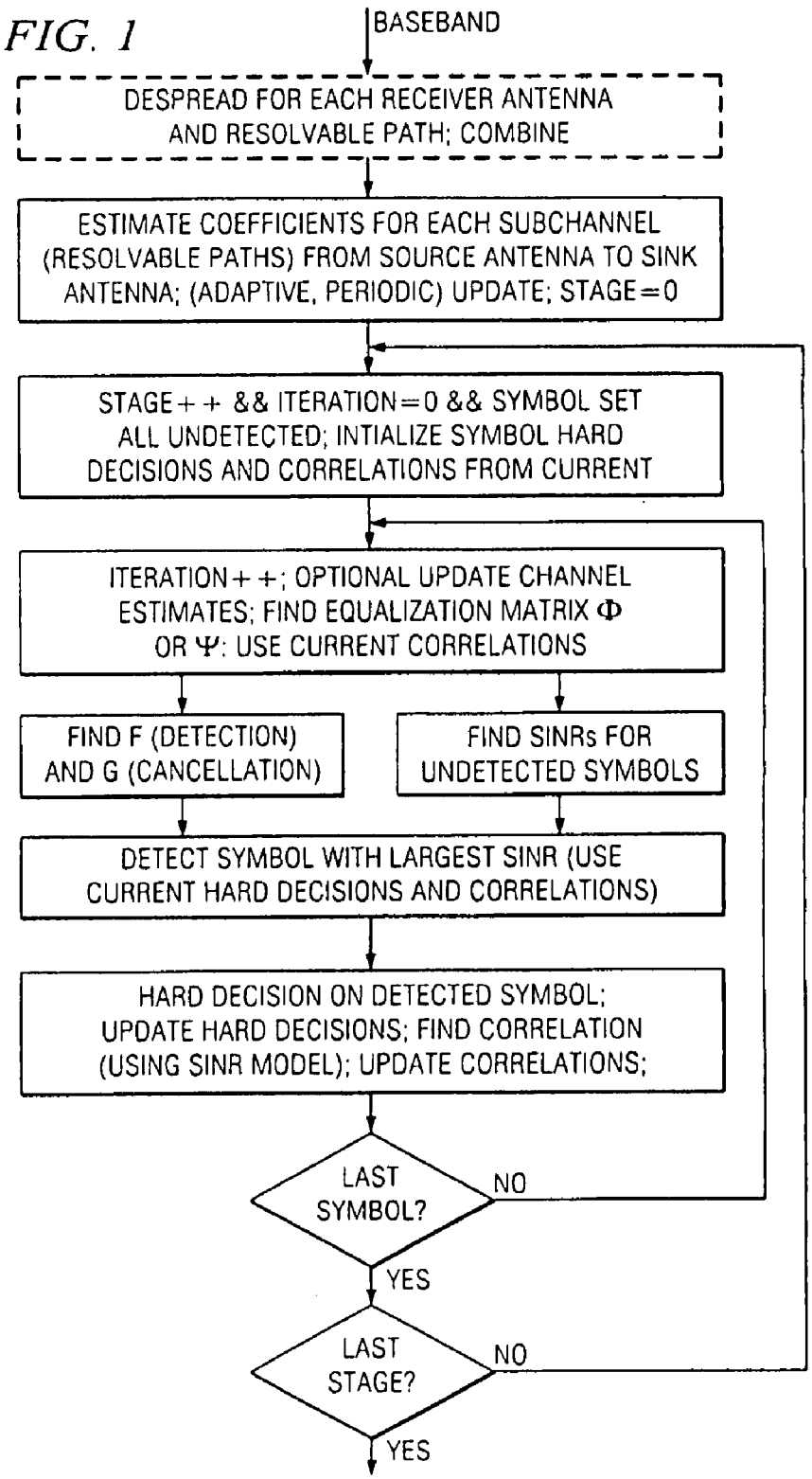

ITERATIVE DETECTION IN MIMO SYSTEMS

CROSS-REFERENCE TO RELATED APPLICATIONS

The following copending application dislcoses related subject matter and has a common assignee: application Ser. No. 10/618,970, filed Jul. 14, 2003.

BACKGROUND OF THE INVENTION

The present invention relates to communication systems, and more particularly to multiple-input multiple-output wireless systems.

Wireless communication systems typically use band-limited channels with time-varying (unknown) distortion and may have multi-users (such as multiple cellphone users within a cell). This leads to intersymbol interference and multi-user interference, and requires interference-resistant detection for systems which are interference limited. Interference-limited systems include multi-antenna systems with multi-stream or space-time coding which have spatial interference, multi-tone systems, TDMA systems having frequency selective channels with long impulse responses leading to intersymbol interference, CDMA systems with multi-user interference arising from loss of orthogonality of spreading codes, high data rate CDMA which in addition to multi-user interference also has intersymbol interference.

Interference-resistant detectors commonly invoke one of three types of equalization to combat the interference: maximum likelihood sequence estimation, (adaptive) linear filtering, and decision-feedback equalization. However, maximum likelihood sequence estimation has problems including impractically large computation complexity for systems with multiple transmit antennas and multiple receive antennas. Linear filtering equalization, such as linear zero-forcing and linear minimum square error equalization, has low computational complexity but has relatively poor performance due to excessive noise enhancement. And decision-feedback (iterative) detectors, such as iterative zero-forcing and iterative minimum mean square error, have moderate computational complexity but only moderate performance.

An iterated decision approach appears in Chan and Wornell, A Class of Block-Iterative Equalizers for Intersymbol Interference Channels: Fixed Channel Results, 49 IEEE Tran. Comm. 1966 (2001) and Chan and Wornell, A Class of Asymptotically Optimum Iterated-Decision Multiuser Detectors, Proc. IEEE ICASSP 2265 (2001).

SUMMARY OF THE INVENTION

The present invention provides a method and detector for multiple-input multiple-output (MIMO) systems with progressive refinement of soft symbol estimates by iterative detection across antennas in several stages while accounting for decision-feedback error.

This has advantages including improved performance for wireless systems.

BRIEF DESCRIPTION OF THE DRAWINGS

FIG. 1 is a flow diagram.

DETAILED DESCRIPTION OF THE PREFERRED EMBODIMENTS

1. Overview

Figure 2A:
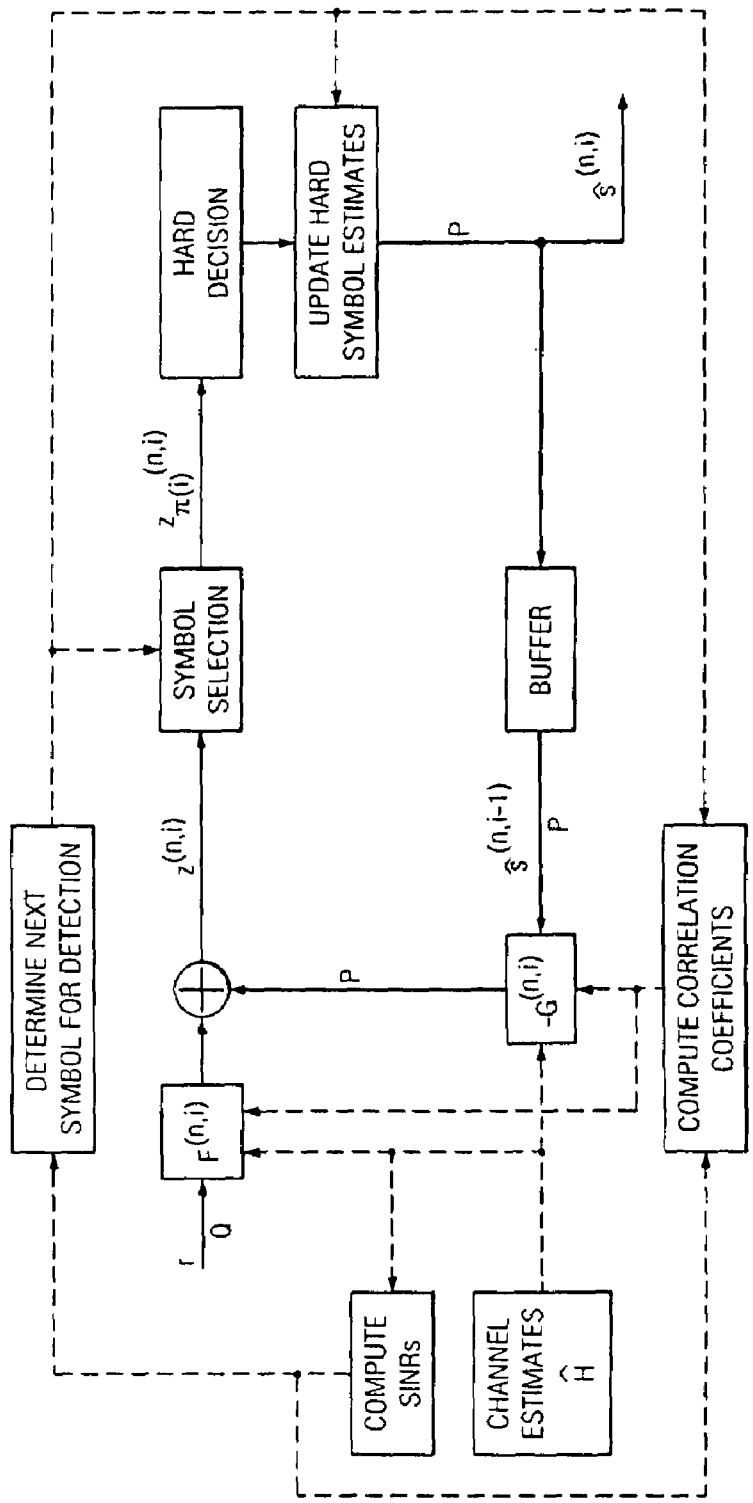
FIGS. 2a-2c illustrate functional blocks of detectors, receivers, and transmitters.

Preferred embodiment detection methods for multi-input, multi-output (MIMO) systems progressively refine soft symbol estimates by iterative detections across multiple antennas in multiple stages while accounting for the effects of decision-feedback errors. FIG. 1 is a flow diagram for first preferred embodiment methods and shows an inner loop which iteratively detects each transmitted symbol using cancellation of previously detected symbols and an outer loop of detection stages which refine the inner loop detections. Explicitly, the preferred embodiments estimate a P-vector of transmitted symbols s from a P-vector $z=Fr-G\hat{s}$ where F is a P×Q IMMSE detector applied to the Q-vector of received signals r, and G is a P×P interference canceller applied to the P-vector of prior detection hard decisions $\hat{s}$; both F and G are refined for each symbol detection and also for successive stages of detections.

The usual iterative MMSE detection method estimates each symbol once using full cancellation of previously detected symbols as if the prior symbol detection were error free. In contrast, preferred embodiment detectors and methods incorporate multistage iterative MMSE detection with the following characteristics:

(a) N≧2 detection stages. Each detection stage includes P iterations where P is the number of transmitter antennas and symbol streams. Each stage iteratively applies MMSE (IMMSE) detection to obtain soft and hard estimates of all P symbols $(s_1, s_2, \ldots, s_P)$. After all P symbols are detected, the next stage is started using the results of the prior stage as initial conditions, and the first stage is analogous to the usual IMMSE and has 0 initial conditions. That is, if (n,i) denotes the ith detection iteration during the nth stage so that $\hat{s}^{(n,i)}$ are the current hard decisions for the detected symbols, then $\hat{s}^{(n,0)}=\hat{s}^{(n-1,P)}$ are initial conditions for incrementing stages and $\hat{s}^{(1,0)}=0$ are the initial conditions for the first stage.

(b) Account for decision feedback (interference cancellation) error. Determine the effect of decision feedback error by the correlation between the hard decision feedback and the actual symbols. This correlation is a function of the post-detection SINR which depends upon the channel state H. This correlation may be updated every iteration.

(c) Within each stage, order the iterations according to the post-detection SINR of the symbols. The first iteration detects (hard decision on the soft estimate) the symbol with the largest SINR, and a contribution of this symbol subtracted (at least partial cancellation) for the second iteration. The second iteration detects the symbol among the remaining (non-cancelled) symbols with the largest SINR. And so forth.

(d) Improve the reliability of the hard decision symbol estimates in the feedback (cancellations) from stage to stage. This improves the interference subtractions. The preferred embodiment approach relates the portion of the hard decision symbol estimate subtracted to the reliability of the hard decision.

Figure 2B:
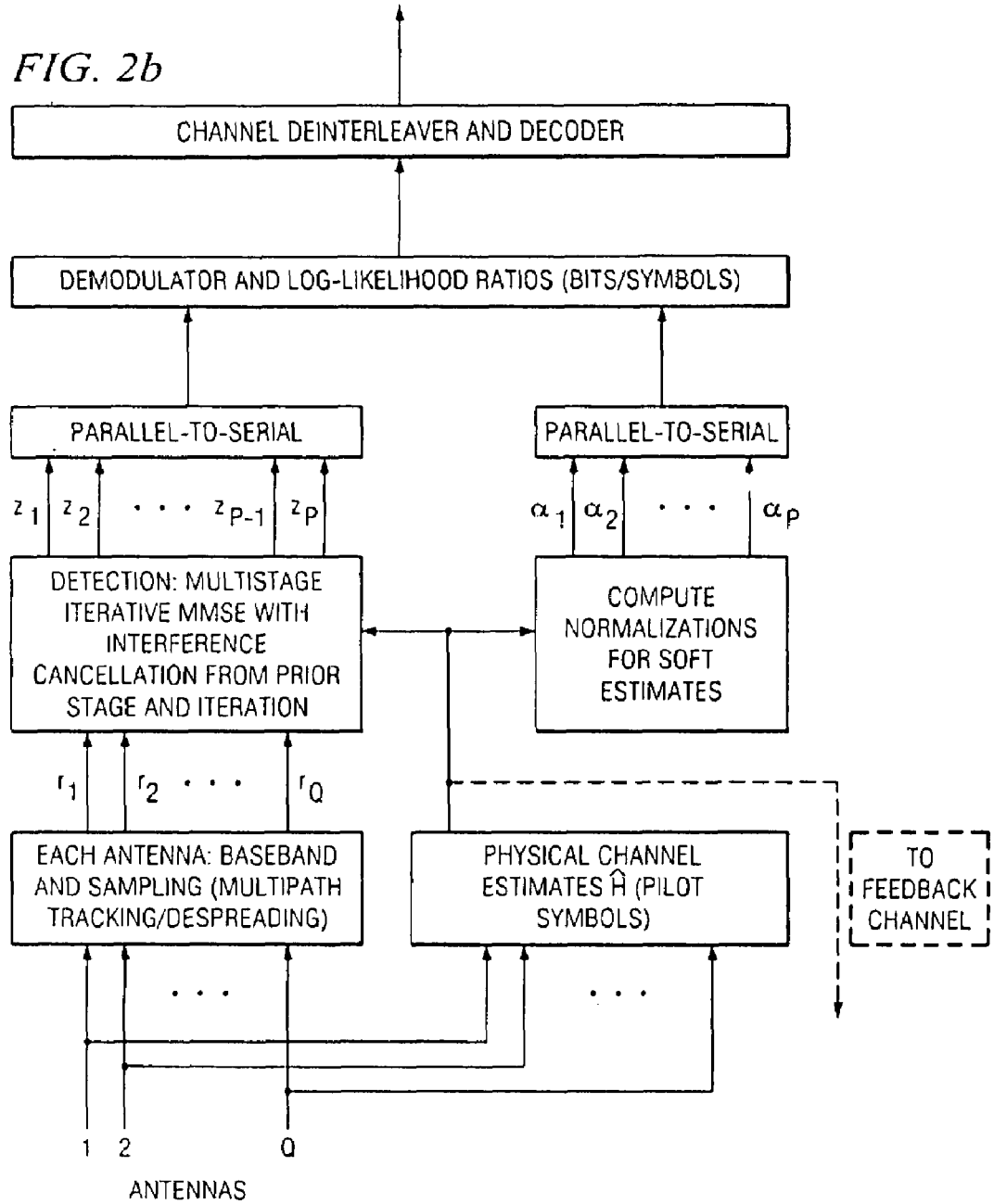
Figure 2C:
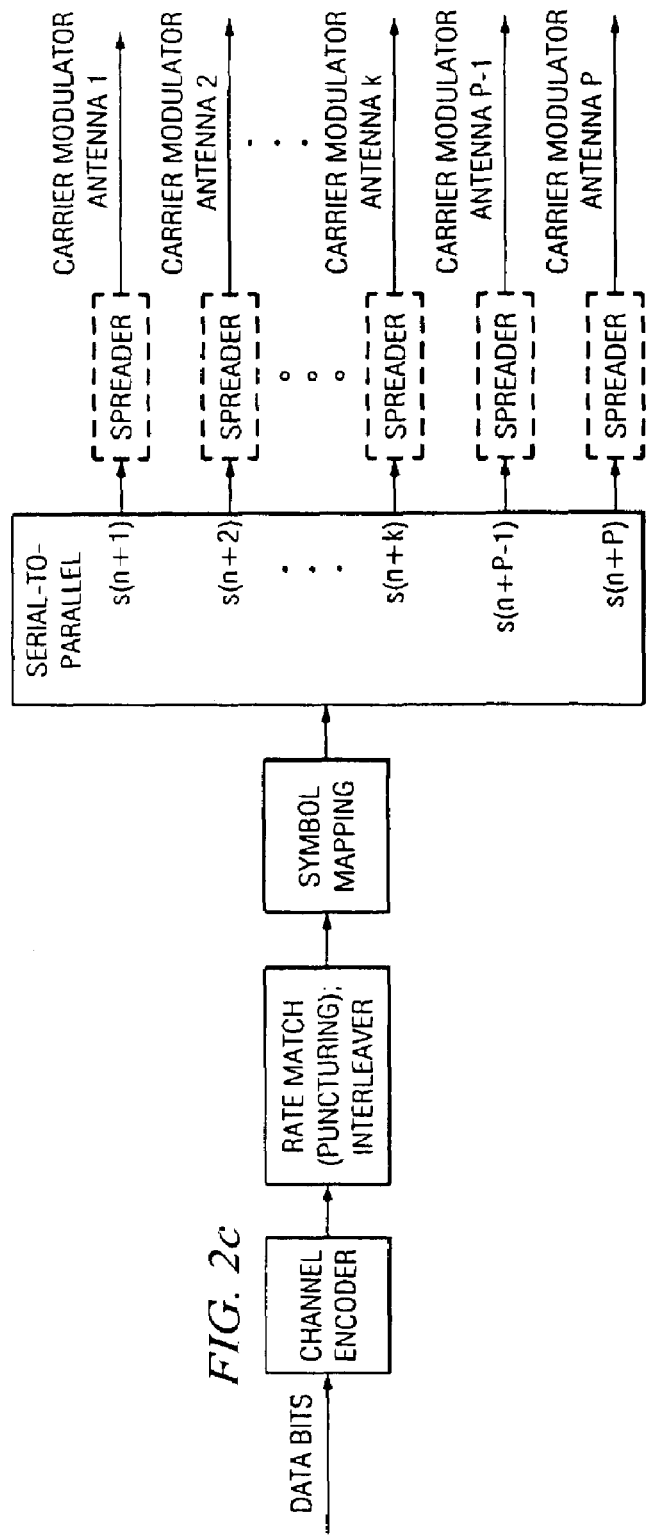

Preferred embodiment wireless communication systems incorporate preferred embodiment detection methods. FIGS. 2a-2b illustrate functional blocks of a preferred embodiment detector and corresponding receiver for a MIMO wireless communications system; and FIG. 2c shows a multiple-antenna transmitter for such a system. In such systems components, base stations, and mobile users, could each include one or more application specific integrated circuits (ASICs), (programmable) digital signal processors (DSPs), and/or other programmable devices with stored programs for implementation of the preferred embodiment. The base stations and mobile users may also contain analog integrated circuits for amplification of inputs to or outputs from antennas and conversion between analog and digital; and these analog and processor circuits may be integrated on a single die. The stored programs may, for example, be in external or onboard ROM, flash EEPROM, and/or FeRAM. The antennas may be parts of RAKE detectors with multiple fingers for each user's signals. The DSP core could be a TMS320C6xxx or TMS320C5xxx from Texas Instruments.

2. Single Stage Iterative MMSE Detectors

FIG. 2b illustrates a receiver with an interference-resistant detector as could be used in a wireless communications system with P transmit antennas (P data streams) and Q receive antennas. FIG. 2c illustrates a corresponding transmitter with P transmit antennas. The received signal in such a system can be written as:

$$r = Hs + w$$

where r is the Q-vector of samples of the received baseband signal (complex numbers) corresponding to a transmission time n:

$$r = \begin{bmatrix} r_1(n) \\ r_2(n) \\ \vdots \\ r_Q(n) \end{bmatrix};$$

s is the P-vector of transmitted symbols (complex numbers of a symbol constellation) for time n:

$$s = \begin{bmatrix} s_1(n) \\ s_2(n) \\ \vdots \\ s_P(n) \end{bmatrix};$$

H is the Q×P channel matrix of attenuations and phase shifts; and w is a Q-vector of samples of received (white) noise. That is, the (q,p)th element of H is the channel (including multipath combining and equalization) from the pth transmit source to the qth receive sink, and the qth element of w is the noise seen at the qth receive sink.

Note that the foregoing relation applies generally to various systems with various interference problems and in which n, r, s, P, and Q have corresponding interpretations. For example:

(i) High data rate multi-antenna systems such as BLAST (Bell Labs layered space time) or MIMO and multi-stream space-time coding: spatial interference suppression techniques are used in detection.

(ii) Broadband wireless systems employing OFDM (orthogonal frequency division multiplex) signaling and MIMO techniques for each tone or across tones.

(iii) TDMA (time division multiple access) systems having frequency-selective channels with long impulse response which causes severe ISI (intersymbol interference). Use equalizers to mitigate ISI.

(iv) CDMA (code division multiple access) systems having frequency-selective channels which cause MUI (multi-user interference) as a result of the loss of orthogonality between spreading codes. For high data rate CDMA systems such as HSDPA and 1xEV-DV, this problem is more severe due to the presence of ISI. Equalizers and/or interference cancellation may be used to mitigate these impairments.

(v) Combinations of foregoing.

P is essentially the number of symbols that are jointly detected as they interfere with one another, and Q is simply the number of collected samples at the receiver. Because there are P independent sources, Q must be at least as large as P to separate the P symbols. A detector in a receiver as in FIGS. 2a-2b outputs soft estimates z of the transmitted symbols s to a demodulator and decoder.

Presume that different symbols that are transmitted via P different antennas are uncorrelated and may also may utilize different modulation schemes. This implies the P×P matrix of expected symbol correlations, $\Lambda = E[ss^H]$, is diagonal with entries equal the expected symbol energies ($\lambda_k = E[|s_k|^2]$):

$$\Lambda = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_P \end{bmatrix}$$

For linear filtering equalization detectors, such as linear zero-forcing (LZF) or linear minimum mean square error (LMMSE), the soft estimates, denoted by P-vector z, derive from the received signal by linear filtering with P×Q matrix F; namely, z=F r. LMMSE detection finds the matrix F by minimizing the mean square error, $E[\|z-s\|^2]$. With perfect estimation of the channel H, the minimizing matrix F is given by:

$$F = [H^H H + \sigma^2 \Lambda^{-1}]^{-1} H^H$$
$$= \Lambda H^H [H \Lambda H^H + \sigma^2 I_Q]^{-1}$$

where $\sigma^2$ is the variance per symbol of the additive white noise w and $I_Q$ is the Q×Q identity matrix. Note F has the form of a product of an equalization matrix with $H^H$ which is the matrix of the matched filter for the channel.

A one-stage iterative (decision-feedback) detector for blocks of P symbols has a series of P linear detectors (P iterations) with each linear detector followed by a (hard) decision device and interference subtraction (cancellation). Each of the P linear detectors (iterations) generates both a hard and a soft estimate for one of the P symbols. The hard estimate is used to regenerate the interference arising from the already-estimated symbols which is then subtracted from the received signal, and the difference used for the next linear symbol estimation. This presumes error-free decision feedback. More explicitly, let s denote the P-vector of transmitted symbols to be estimated, $\hat{s}^{(i)}$ denote the ith iteration output P-vector of hard symbol estimates (first i components equal to the hard estimates $\hat{s}_1, \hat{s}_2, \ldots, \hat{s}_i$ of the first i symbols, $s_1, s_2, \ldots, s_i$, and the remaining P−i components each equal to 0, and $z^{(i)}$ denote the ith iteration output P-vector of soft estimates of $s_1-\hat{s}_1, s_2-\hat{s}_2, \ldots, s_{i-1}-\hat{s}_{i-1}, s_i, s_{i+1}, \ldots, s_P$. That is, estimates of the transmitted symbols with the already-estimated first i−1 symbols subtracted out. The hard decision for the ith symbol, $\hat{s}_i$, arises from application of a hard decision operator on the soft estimate: $\hat{s}_i = D\{z_i^{(i)}\}$. The ith iteration detection is:

$$z^{(i)} = F^{(i)} r - F^{(i)} H \hat{s}^{(i-1)}$$

where the second term is the soft estimation of the regenerated (propagated by H) hard decision symbol estimates of the prior i−1 iterations. For the first iteration there are no already-estimated symbols, so $\hat{s}^{(0)} = 0_P$ (a P-vector with each component equal to 0). Of course, the ith iteration soft estimates $z_1^{(i)}, z_2^{(i)}, \ldots, z_{i-1}^{(i)}$ are ideally just estimates of channel noise because the hard estimates would exactly cancel the transmitted symbols. Thus computational simplicity suggests omitting these computations by zeroing-out the corresponding rows (columns) of the matrices. More precisely, take:

$$z^{(i)} = F^{(i)} r - G^{(i)} \hat{s}^{(i-1)}$$

where $F^{(i)}$ and $G^{(i)}$ are the P×Q detection matrix and the P×P interference cancellation matrix for the ith iteration, respectively, defined as:

$$F^{(i)} = \begin{bmatrix} 0_{(i-1) \times Q} \\ \Phi^{(i)} \end{bmatrix}$$

$$G^{(i)} = F^{(i)} [B_{i-1} 0_{Q \times (P-i+1)}]$$

where the inversion matrix for IMMSE is $$\Phi^{(i)} = (A_i^H A_i + \sigma^2 \Lambda_i^{-1})^{-1} A_i^H$$
$$= \Lambda_i A_i^H (A_i \Lambda_i A_i^H + \sigma^2 I_Q)^{-1}$$

with the last P−i+1 and first i−1 symbol portions of the channel matrix H defined in terms of the P column vectors $h_1, h_2, \ldots, h_P$ of H as:

$A_i = [h_i, h_{i+1}, \ldots, h_P]$ a Q×(P−i+1) matrix, and
$B_i = [h_1, h_2, \ldots, h_{i-1}]$ a Q×(i−1) matrix.

Also, $0_{(i-1) \times Q}$ is the (i−1)×Q matrix of 0s, $0_{Q \times (P-i+1)}$ is the Q×(P−i+1) matrix of 0s, and $\Lambda_i$ is the lower-right (P−i+1)×(P−i+1) diagonal submatrix of $\Lambda$ and thus the symbol energies of the symbols not-already estimated.

Ordered detection based on the symbol post-detection signal-to-interference-plus-noise ratio (SINR) is often used to reduce the effect of decision feedback error. In particular, let the detection order be $\pi(1), \pi(2), \ldots, \pi(P)$ where $\pi( )$ is a permutation of the P integers $\{1, 2, \ldots, P\}$; that is, the first estimated symbol (hard estimate output of the first stage of the iteration) will be $\hat{s}_{\pi(1)}$ and thus also be the corresponding nonzero element of $\hat{s}^{(1)}$. The maximum SINR of the components of the first soft estimate $z^{(1)}$, which estimates all P symbols, determines $\pi(1)$. Similarly, the SINRs of the components of $z^{(2)}$, which estimates all of the symbols except the cancelled $s_{\pi(1)}$, determines $\pi(2)$, and so forth. That is, the ith iteration estimates symbol $s_{\pi(i)}$, and modifying the foregoing to accommodate the ordering is routine but omitted for clarity in notation.

These MMSE detectors are biased in the sense that $E[z_k|s_k] - s_k \neq 0$. However, the bias of the MMSE detectors can be removed by applying a scaling factor to the soft outputs. This scaling factor does not affect post-detection SINR, yet results in increased mean square error compared to the regular biased MMSE estimate. While this unbiasing operation does not affect the performance of LMMSE detectors, it improves the performance of IMMSE detectors because the decision device that is used to generate decision feedback assumes unbiased soft output. The unbiasing operation for IMMSE detectors rescales the soft estimates as follows:

$$\check{z}_p = z_p / \alpha_p$$

where $$\alpha_p = \lambda_p h_p^H [A_p \Lambda_p A_p^H + \sigma^2 I_Q]^{-1} h_p$$
$$= ([A_p^H A_p + \sigma^2 \Lambda_p^{-1}]^{-1} A_p^H A_p)_{1,1}$$

with $\check{z}_p$ denoting the soft output after unbiasing and the subscript 1,1 denoting the (1,1) matrix element. For unbiased IMMSE, variance-based and mean-squared-error-based normalizations are equivalent.

3. Multistage Iterative MMSE Detector Preferred Embodiments

FIG. 1 is a flow diagram for first preferred embodiment detection methods which include refinement stages (outer loop) of iterative MMSE detections (inner loop). More explicitly, the methods include the following steps in which the superscript (n,i) indicates values generated during the ith iteration within the nth stage, (n,0) denotes the initial conditions for the first iteration in the nth stage, and thus (1,0) denotes the overall initial conditions. Explanations and definitions follow this listing of the steps:

(1) compute the P×P equalization matrix $\Phi^{(n,i)}$ from the estimated Q×P transmission channel matrix H and the P×P correlation matrix $R^{(n,i-1)}$ which is a diagonal matrix with the (k,k)th element equal to the correlation $\rho_k^{(n,i-1)}$ between the kth symbol and the hard decision for the kth symbol available from the iteration (n,i−1) detection.

(2) compute the forward detection P×Q matrix $F^{(n,i)}$ using H and $\Phi^{(n,i)}$ from (1).

(3) compute the P×P cancellation matrix $G^{(n,i)}$ using H, $F^{(n,i)}$ from (2), and $R^{(n,i-1)}$.

(4) compute soft estimate P-vector $z^{(n,i)}$ using received Q-vector of samples r, $F^{(n,i)}$ from (2), $G^{(n,i)}$ from (3), and the P-vector of hard decisions, $\hat{s}^{(n,i-1)}$, available from the iteration (n,i−1) detection.

(5) compute the post-detection SINRs, $\gamma_k^{(n,i)}$, for soft estimates $z_k^{(n,i)}$ from (4) for all P−i+1 symbols not previously detected during the iteration (n,1), (n,2), ..., (n,i−1) detection(s) of the nth stage; this uses $\Phi^{(n,i)}$ from (1) and $R^{(n,i-1)}$.

(6) let $\pi(i)$ denote the subscript k from (5) which labels the largest $\gamma_k^{(n,i)}$, and detect symbol $s_{\pi(i)}$ using soft estimate $z_{\pi(i)}^{(n,i)}$ from (4); this detection may be part of a sequence decoding and/or a hard decision decoding; also provide hard decision $\hat{s}_{\pi(i)}^{(n,i)} = D(z_{\pi(i)}^{(n,i)})$ for use in interference cancellation in subsequent detections.

(7) update the P-vector of hard decisions $\hat{s}^{(n,i-1)}$ to $\hat{s}^{(n,i)}$ by changing the $\pi(i)$ component from $\hat{s}_{\pi(i)}^{(n,i-1)}$ to $\hat{s}_{\pi(i)}^{(n,i)}$ from (6) and leaving all other components unchanged.

(8) compute the correlation $\rho_{\pi(i)}^{(n,i)}$ and then update correlation matrix $R^{(n,i-1)}$ to $R^{(n,i)}$ by changing the $\pi(i)$ diagonal element from $\rho_{\pi(i)}^{(n,i-1)}$ to $\rho_{\pi(i)}^{(n,i)}$ and leaving all other elements unchaged. The computation of $\rho_{\pi(i)}^{(n,i)}$ may use $\gamma_{\pi(i)}^{(n,i)}$ from (5)-(6) and a constellation plus noise model or may be assessed by ensemble averaging.

Steps (1)-(8) are performed P times to complete one IMMSE detection (inner loop). The initial conditions for the inner loop are taken from the results of the prior stage: $R^{(n,0)}=R^{(n-1,P)}$ and $\hat{s}^{(n,0)}=\hat{s}^{(n-1,P)}$. The first stage (overall) initial conditions are simply $R^{(1,0)}=0$ and $\hat{s}^{(1,0)}=0$.

FIG. 2a illustrates the flow of data (solid arrows) and control (broken arrows) in the foregoing steps which, in more detail, proceed as:

$$z^{(n,i)}=F^{(n,i)}r-G^{(n,i)}\hat{s}^{(n,i-1)} \text{ for } 1 \leq n \leq N, 1 \leq i \leq P$$

with $\hat{s}^{(1,0)}=0_P$ $$\hat{s}^{(n,0)}=\hat{s}^{(n-1,P)} \text{ for } 2 \leq n \leq N$$

Find the $F^{(n,i)}$ and $G^{(n,i)}$ by maximizing the post-detection SINRs of the symbols as follows. First, substituting $r=Hs+w$, yields $$z^{(n,i)} = F^{(n,i)}r - G^{(n,i)}\hat{s}^{(n,i-1)}$$
$$= F^{(n,i)}(Hs + w) - G^{(n,i)}\hat{s}^{(n,i-1)}$$

so impose a unity gain constraint: require the diagonal elements of $F^{(n,i)}H$ to equal 1. (This is analogous to the unbiasing operation for IMMSE.) Hence, for each (n,i) the soft symbol estimate may be written:

$$z_p^{(n,i)}=s_p+\eta_p^{(n,i)} \text{ for } 1 \leq p \leq P$$

where $\eta_p^{(n,i)}$ is the residual interference plus noise term.

Simplify the optimization to find $F^{(n,i)}$ and $G^{(n,i)}$ by presuming the correlation of the transmitted symbols and their hard estimates is expressed by a P×P correlation matrix:

$$\Lambda^{-1}E[s\hat{s}^{(n,i)H}] = R^{(n,i)} = \begin{bmatrix} \rho_1^{(n,i)} & 0 & \cdots & 0 \\ 0 & \rho_2^{(n,i)} & \cdots & 0 \\ \vdots & \vdots & \ddots & \vdots \\ 0 & 0 & \cdots & \rho_P^{(n,i)} \end{bmatrix}$$

Then the post-detection SINR for symbol $s_k$, denoted $\gamma_k^{(n,i)}$, is expressed as:

$$\gamma_k^{(n,i)}=\lambda_k/E[|\eta_k^{(n,i)}|^2]$$

Now determine $F^{(n,i)}$ and $G^{(n,i)}$ by maximizing the $\gamma_k^{(n,i)}$; this yields:

$$G^{(n,i)}=(F^{(n,i)}H-I_P)R^{(n,i-1)}$$

$$F^{(n,i)} = \begin{bmatrix} 1/[h_1^H\Psi^{(n,i)}h_1] & \cdots & 0 \\ \vdots & \ddots & \vdots \\ 0 & \cdots & 1/[h_P^H\Psi^{(n,i)}h_P] \end{bmatrix} H^H\Psi^{(n,i)}$$

where $\Psi^{(n,i)}=[H(I_{P-R}^{(n,i-1)2})\Lambda H^H+\sigma^2 I_Q]^{-1}$ is a Q×Q equalization matrix.

Applying the matrix inversion lemma gives the alternative formulation used in the foregoing listing of the detection steps:

$$F^{(n,i)} = \begin{bmatrix} 1/[\Phi^{(n,i)}H^H H]_{11} & \cdots & 0 \\ \vdots & \ddots & \vdots \\ 0 & \cdots & 1/[\Phi^{(n,i)}H^H H]_{PP} \end{bmatrix} \Phi^{(n,i)}H^H$$

where $\Phi^{(n,i)}=[H^H H(I_P-R^{(n,i-1)2})+\sigma^2\Lambda^{-1}]^{-1}$ is a P×P equalization matrix.

The transformation $G^{(n,i)}$ controls the amount of interference cancellation at every iteration. When hard decisions are highly reliable (i.e., $R^{(n,i-1)} \cong I_P$), full subtraction is performed; otherwise, partial subtraction according to the correlation.

The SINRs $\gamma_k^{(n,i)}$ expressed in terms of $\Phi^{(n,i)}$ and prior correlations $\rho_k^{(n,i-1)}$ are:

$$\gamma_k^{(n,i)}=\{1/(1-\rho_k^{(n,i-1)2})\}\{1/[\sigma^2\Lambda^{-1}\Phi^{(n,i)}]_{kk}-1\}$$

This follows from the maximization finding F and G.

The correlations $\rho_p^{(n,i)}$ can be assessed by either (i) ensemble averaging estimation or (ii) an analytical model using $\gamma_p^{(n,i)}$.

In particular, for ensemble averaging, a pilot channel or a set of training symbols that undergoes the same MIMO channel can be used. For instance, in WCDMA, the common pilot channel (CPlCh) can be used for this purpose. First, the received signal corresponding to the known training symbols are passed through the detector. Since the training symbols are foreknown, one can estimate the correlations from the ensemble average of the sample correlation between the training symbols and the resulting detected symbols.

In contrast, an analytic model allows direct computation without the delay of ensemble averaging. Indeed, the definition of correlation implies:

$$\rho_p^{(n,i)}=(1/E[|s_p|^2])\Sigma_{j,k}c_jc_k^*\text{Prob}[\hat{s}_p^{(n,i)}=c_j,s_p=c_k]$$

where $c_j$ and $c_k$ are symbols in the symbol constellation (which may depend upon p because the constellations may differ among the symbol streams), and $$E[|s_p|^2])=\Sigma_k|c_k|^2\text{Prob}[s_p=c_k]$$

Now the hard decision $\hat{s}_p^{(n,i)}=D(z_p^{(n,i)})$ is a maximum likelihood decision (see section 6 for alternatives) for $z_p^{(n,i)}=s_p+\eta_p^{(n,i)}$ where $\eta_p^{(n,i)}$ is the residual interference plus noise and may be approximated as (complex) normally distributed with mean 0 and variance $\lambda_p/\gamma_p^{(n,i)}$. (Exact expressions which avoid this approximation are more complicated with little accuracy improvement.) Thus the correlations $\rho_p^{(n,i)}$ can be evaluated as functions of the SINRs $\gamma_p^{(n,i)}$ and the symbol constellations.

As example, for the QPSK symbol constellation with all four symbols equi-likely, the maximum likelihood decision reduces to the signum function applied to the real and imaginary parts and scaled for energy:

$$\text{Re}\{\hat{s}_p^{(n,i)}\}=\text{sgn}(\text{Re}\{z_p^{(n,i)}\})\sqrt{(\lambda_p/2)}$$

$$\text{Im}\{\hat{s}_p^{(n,i)}\}=\text{sgn}(\text{Im}\{z_p^{(n,i)}\})\sqrt{(\lambda_p/2)}.$$

Similarly for the 16-QAM constellation (scaled to $\lambda_p=1$ for notational convenience):

$$\text{Re}\{\hat{s}_p^{(n,i)}\} = -3/\sqrt{10} \text{ if } \text{Re}\{z_p^{(n,i)}\} \leq -2\sqrt{10}$$

-continued $$= -1/\sqrt{10} \quad \text{if} \quad -2\sqrt{10} < \text{Re}\{z_p^{(n,i)}\} \leq 0$$
$$= 1/\sqrt{10} \quad \text{if} \quad 0 < \text{Re}\{z_p^{(n,i)}\} \leq 2\sqrt{10}$$
$$= 3/\sqrt{10} \quad \text{if} \quad 2\sqrt{10} < \text{Re}\{z_p^{(n,i)}\}$$

And analogously for the imaginary parts.

The normal distribution of $\eta_p^{(n,i)}$ implies for the QPSK constellation:

$$\rho_p = 1 - 2Q(\sqrt{\gamma_p})$$

where $Q(x)$ is the x-tail of the normal distribution (Gaussian Q function). A similar result holds for the 16-QAM constellation:

$$\rho_p = 1 - (1/5)\{3Q(\sqrt{\gamma_p/5}) + 4Q(3\sqrt{\gamma_p/5}) + 3Q(5\sqrt{\gamma_p/5})\}$$

Section 5 describes preferred embodiment implementation details.

4. Illustrative Example of Preferred Embodiment Methods

To illustrate the refining of the interference cancellation in the foregoing preferred embodiment methods, consider the low-complexity case of $P=Q=2$ and a simple channel matrix $$\begin{bmatrix} h & h \\ h & ih \end{bmatrix}$$

where h is an attenuation and phase factor. (A physical case of parallel antenna pairs with an offset could have such a channel matrix.) Now F is of order $1/h$ and $\Phi$ is of order $1/h^2$, so simplify the notation by combining the channel coefficient h, symbol energy $\lambda$ (take both symbols of equal energy), and the channel noise power $\sigma^2$ into a single parameter: $S = \sigma^2/(|h|^2\lambda)$, and ignore the h scale factors of F and $\Phi$. That is, take:

$$H = \begin{bmatrix} 1 & 1 \\ 1 & i \end{bmatrix}, \text{ so } H^H = \begin{bmatrix} 1 & 1 \\ 1 & -i \end{bmatrix}, \text{ and } H^H H = \begin{bmatrix} 2 & 1+i \\ 1-i & 2 \end{bmatrix}$$

First compute the equalization matrix:

$$\Phi^{(n,i)} = [H^H H(I - R^{(n,i-1)2}) + SI]^{-1}$$
$$= \begin{bmatrix} 2(1-\rho_1^2) + S & (1+i)(1-\rho_2^2) \\ (1-i)(1-\rho_1^2) & 2(1-\rho_2^2) + S \end{bmatrix}^{-1}$$

where $\rho_k = \rho_k^{(n,i-1)}$ for $k = 1, 2$ $$= (1/\Delta) \begin{bmatrix} 2(1-\rho_2^2) + S & -(1+i)(1-\rho_2^2) \\ -(1-i)(1-\rho_1^2) & 2(1-\rho_1^2) + S \end{bmatrix}$$

where the determinant is $\Delta = [2(1-\rho_1^2) + S][2(1-\rho_2^2) + S] - 2(1-\rho_1^2)(1-\rho_2^2)$.

Next, compute the forward detection: $F^{(n,i)} = D^{(n,i)}\Phi^{(n,i)}H^H$ where $D^{(n,i)}$ is the 2×2 diagonal matrix which makes the diagonal elements of $F^{(n,i)}H$ equal 1 to avoid biasing the estimates. Of course, $F^{(n,i)}H$ equals $D^{(n,i)}\Phi^{(n,i)}H^H H$, which is used to evaluate $D^{(n,i)}$ as follows:

$$\Phi^{(n,i)} H^H H = (1/\Delta) \begin{bmatrix} 2(1-\rho_2^2) + S & -(1+i)(1-\rho_2^2) \\ -(1-i)(1-\rho_1^2) & 2(1-\rho_1^2) + S \end{bmatrix} \begin{bmatrix} 2 & 1+i \\ 1-i & 2 \end{bmatrix}$$

$$= (1/\Delta) \begin{bmatrix} 2(1-\rho_2^2) + 2S & (1+i)S \\ (1-i)S & 2(1-\rho_1^2) + 2S \end{bmatrix}$$

so $D^{(n,i)} = \Delta \begin{bmatrix} 1/[2(1-\rho_2^2) + 2S] & 0 \\ 0 & 1/[2(1-\rho_1^2) + 2S] \end{bmatrix}$.

Hence, $F^{(n,i)} = D^{(n,i)}\Phi^{(n,i)}H^H$ $$= \Delta \begin{bmatrix} 1/[2(1-\rho_2^2) + 2S] & 0 \\ 0 & 1/[2(1-\rho_1^2) + 2S] \end{bmatrix} \times$$

$$\begin{bmatrix} 2(1-\rho_2^2) + S & -(1+i)(1-\rho_2^2) \\ -(1-i)(1-\rho_1^2) & 2(1-\rho_1^2) + S \end{bmatrix} \begin{bmatrix} 1 & 1 \\ 1 & -i \end{bmatrix}$$

$$= \Delta \begin{bmatrix} 1/[2(1-\rho_2^2) + 2S] & 0 \\ 0 & 1/[2(1-\rho_1^2) + 2S] \end{bmatrix}$$

$$\begin{bmatrix} (1-i)(1-\rho_2^2) + S & (1+i)(1-\rho_2^2) + S \\ (1+i)(1-\rho_1^2) + S & (-1-i)(1-\rho_1^2) - iS \end{bmatrix}$$

$$= \Delta \begin{bmatrix} [(1-i)(1-\rho_2^2) + S]/[2(1-\rho_2^2) + 2S] & [(1+i)(1-\rho_2^2) + S]/[2(1-\rho_2^2) + 2S] \\ [(1+i)(1-\rho_1^2) + S]/[2(1-\rho_1^2) + 2S] & [(-1-i)(1-\rho_1^2) - iS]/[2(1-\rho_1^2) + 2S] \end{bmatrix}$$

Next, compute the cancellation matrix: $G^{(n,i)} = (F^{(n,i)}H - I)R^{(n,i-1)}$. The term $F^{(n,i)}H$ equals $D^{(n,i)}\Phi^{(n,i)}H^H H$ and the two factors $D^{(n,i)}$ and $\Phi^{(n,i)}H^H H$ appear above, thus $$F^{(n,i)}H = \begin{bmatrix} 1/[2(1-\rho_2^2) + 2S] & 0 \\ 0 & 1/[2(1-\rho_1^2) + 2S] \end{bmatrix}$$

$$\begin{bmatrix} 2(1-\rho_2^2) + 2S & (1+i)S \\ (1-i)S & 2(1-\rho_1^2) + 2S \end{bmatrix}$$

$$= \begin{bmatrix} 1 & (1+i)S/[2(1-\rho_2^2) + 2S] \\ (1-i)S/[2(1-\rho_1^2) + 2S] & 1 \end{bmatrix}$$

Hence, $G^{(n,i)} = (F^{(n,i)}H - I)R^{(n,i-1)}$ $$= \begin{bmatrix} 0 & (1+i)S/[2(1-\rho_2^2) + 2S] \\ (1-i)S/[2(1-\rho_1^2) + 2S] & 0 \end{bmatrix}$$

$$\begin{bmatrix} \rho_1 & 0 \\ 0 & \rho_2 \end{bmatrix}$$

$$= \begin{bmatrix} 0 & \rho_2(1+i)S/[2(1-\rho_2^2) + 2S] \\ \rho_1(1-i)S/[2(1-\rho_1^2) + 2S] & 0 \end{bmatrix}$$

Now the soft estimates are:

$$z^{(n,i)} = F^{(n,i)}r - G^{(n,i)}\hat{s}^{(n,i-1)}$$

So, $z_1^{(n,i)} = \Delta[(1-i)(1-\rho_2^2) + S]/[2(1-\rho_2^2) + 2S]r_1 +$ $\Delta[(1+i)(1-\rho_2^2) + S]/[2(1-\rho_2^2) + 2S]r_2 -$ -continued
$$[\rho_2(1+i)S/[2(1-\rho_2^2)+2S]\hat{s}_2^{(n,i-1)}$$

And similarly for $z_2^{(n,i)}$. The symbol selected for detection is the symbol with greater SINR.

To see the cancellation in the $z^{(n,i)}$ estimates, substitute $r=Hs+w$, thus $z^{(n,i)}=F^{(n,i)}Hs+F^{(n,i)}w-G^{(n,i)}\hat{s}^{(n,i-1)}$. And so:

$$z_1^{(n,i)}=s_1+(1+i)S/[2(1-\rho_2^{(n,i-1)2})+2S](s_2-\rho_2^{(n,i-1)}\hat{s}_2^{(n,i-1)})+[Fw]_1$$

where $$[Fw]_1 = \Delta\{[(1-i)(1-\rho_2^2)+S]/[2(1-\rho_2^2)+2S]\}w_1 + \Delta\{[(1+i)(1-\rho_2^2)+S]/[2(1-\rho_2^2)+2S]\}w_2$$

And analogously for $z_2^{(n,i)}$.

Without loss of generality, consider $z_1^{(n,i)}$; then the $s_2$ interference term is (with explicit superscripts)

$$\{(1+i)S/[2(1-\rho_2^{(n,i-1)2})+2S]\}(s_2-\rho_2^{(n,i-1)}\hat{s}_2^{(n,i-1)})$$

Now as $\rho_2$ increases from 0 to 1, the $s_2$ interference term from F increases because the denominator $[2(1-\rho_2^{(n,i-1)2})+2S]$ decreases, but this is offset by the increasing cancellation from G. The net effect can be quantified by the relation between $\rho_k$ and S. Thus consider the asymptotic case when n becomes large and $\rho_2^{(n,i)}$ and $\hat{s}_2^{(n,i-1)}$ converge to limiting values independent of n and i, and $\hat{s}_2$ (hopefully) equals $s_2$. In this case the $s_2$ interference term simplifies to $$\{S(1-\rho_2)/[(1-\rho_2^2)+S]\}(1+i)s_2/2.$$

To evaluate the factor in braces, apply the equations for $\rho_k$ and $\gamma_k$. For simplicity take the QPSK symbol constellation, thus:

$$\rho_k=1-2Q(\sqrt{\gamma_k}).$$

So $1-\rho_k = 2Q(\sqrt{\gamma_k})$ $$= \sqrt{(2/\pi\gamma_k)}e^{-\gamma_k/2}[1-1/(\gamma_k+2)+1/(\gamma_k+2)(\gamma_k+4)-+\ldots]$$

$$\cong \sqrt{(2/\pi\gamma_k)}e^{-\gamma_k/2} \text{ if } \gamma_k \text{ is large}$$

And $\gamma_k = (1/[1-\rho_k^2])(1/[S\Phi]_{kk}-1)$ $$= \{2[(1-\rho_j^2)+S]/[2(1-\rho_j^2)+S]\}/S \text{ where } j \neq k$$

Because S is positive and the correlations are between $-1$ and 1, the factor $2[(1-\rho_j^2)+S]/[2(1-\rho_j^2)+S]$ is bounded between 1 and 2 with the upper bound tight for $\rho_j$ close to 1. Hence, $$1/S \leq \gamma_k \leq 2/S$$

Note that 1/S is the received symbol SNR per channel and in this example there are 4 channels (combinations of 2 receive antennas and 2 transmit antennas); whereas, the post-detection SINR is the total SINR after detection and thus includes the combining across 2 receive antennas.

A small S implies a large $\gamma_k$ and so $1-\rho_k$ is easily bounded by $e^{-1/2S}$ and thus very small compared to S. Consequently, the asymptotic $s_2$ interference term for small S is:

$$\{S(1-\rho_2)/[(1-\rho_2^2)+S]\}(1+i)s_2/2 \cong$$
$$(1-\rho_2)(1+i)s_2/2 \sim e^{-1/2S}(1+i)s_2/2$$

Hence the overall effect of the preferred embodiment staged interference cancellation is a decrease of the $s_2$ interference from size on the order of S towards an asymptotic size bounded by $e^{-1/2S}$, and so the channel noise term dominates the detection error.

The asymptotic case with not-small S can be numerically or graphically estimated. Indeed, presume (due to symmetry) that $\rho_1=\rho_2$ and $\gamma_1=\gamma_2$ and take a channel with SNR=2(3 dB) as a semi-practical illustration. Thus S=1/2, $\gamma=4[2(1-\rho^2)+1]/[4(1-\rho^2)+1]$, and $\rho=1-2Q(\sqrt{\gamma})$; this yields $\rho \cong 0.93$ and $\gamma \cong 3.4$. And the asymptotic $s_2$ interference term for S=1/2 is:

$$\{S(1-\rho)/[(1-\rho^2)+S]\}(1+i)s_2/2 \cong (0.07)(1+i)s_2/2$$

To see the speed of convergence to the asymptotic state, consider the second stage: $z_1^{(2,1)}$ and presume $s_1$ was detected prior to $s_2$ in the first stage so that $\rho_2^{(1,1)}=0$:

$$z_1^{(2,1)}=s_1+(1+i)S/[2(1-\rho_2^{(2,0)2})+2S](s_2-\rho_2^{(2,0)}\hat{s}_2^{(2,0)})+[Fw]_1$$

where $\rho_2^{(2,0)}=\rho_2^{(1,2)}$ from the first stage. As previously, quantify by using the relations (for QPSK):

$$\rho_2^{(1,2)}=1-2Q(\sqrt{\gamma_2^{(1,2)}})$$

$$\gamma_2^{(1,2)}=\{[(1-\rho_1^{(1,1)2})+S]/[(1-\rho_1^{(1,1)2})+S/2]\}/S$$

Again there is a bound, $1/S \leq \gamma_2^{(1,2)} \leq 2/S$, and the upper bound is tight for $\rho_1^{(1,1)}$ close to 1. Now $\rho^{(1,1)}$ comes from the first stage as $$\rho_1^{(1,1)}=1-2Q(\sqrt{\gamma_1^{(1,1)}})$$

And $\rho_1^{(1,0)}=0$ implies $\gamma_1^{(1,1)}=\{[1+S]/[1+S/2]\}/S$

Thus for small S, $\gamma_1^{(1,1)}$ is large, $\rho_1^{(1,1)}$ is close to 1, $\gamma_2^{(1,2)}$ is large, $1-\rho_2^{(1,2)}$ is very small and roughly bounded by $e^{-1/2S}$, and the $s_2$ interference becomes $\{(1+i)/2\}(s_2-\rho_2^{(1,2)}\hat{s}_2^{(2,0)})$. Thus the second stage is close to full cancellation because $\rho_2^{(1,2)}$ is very close to 1.

Again for not-small S, consider S=1/2; then $\gamma_1^{(1,1)}=12/5$, $\rho_1^{(1,1)}\cong 0.88$, $\gamma_2^{(1,2)}\cong 3.0$, $\rho_2^{(2,0)}=\rho_2^{(1,2)}\cong 0.92$, and the $s_2$ interference term is:

$$(1+i)S/[2(1-\rho_2^{(2,0)2})+2S](s_2-\rho_2^{(2,0)}\hat{s}_2^{(2,0)})\cong(0.1)(1+i)s_2/2$$

which is roughly 1.5 times the asymptotic result.

5. Preferred Embodiment Implementations

The filtering with $F^{(n,i)}$ and $G^{(n,i)}$ can be combined with the symbol selector (see FIG. 2a) to reduce the number of computations in the filtering process. This reduces P-dimensional to 1-dimensional filtering. That is, evaluate the SINRs, which uses the equalization matrix $\Phi$ (or $\Psi$), to pick the symbol to detect, and then only form the needed portions of $F^{(n,i)}$ and $G^{(n,i)}$ and filter.

Two alternative formulations of the derivations of $F^{(n,i)}$ appear in the foregoing; namely, use of the P×P equalization matrix $\Phi$ or the Q×Q equalization matrix $\Psi$. Because $Q \geq P$ (in order to have the rank of $H^H H$ equal to P), the use of $\Phi$ would seem to have lower complexity. However, only for Q much greater than P is $\Phi$ preferred. Rather, for Q=P, which MIMO systems typically use, preferred embodiment implementations avoid apparent matrix inversions using the $\Psi$ approach as follows. First, notice that both $\Phi$ and $\Psi$ change every iteration, and thus they need to be updated NP times for each complete detection. This seemingly implies NP matrix inversions. However, updating $R^{(n,i-1)}$ to $R^{(n,i)}$ changes only the $(\pi(i),\pi(i))$ diagonal element from $\rho_{\pi(i)}^{(n,i-1)}$ to $\rho_{\pi(i)}^{(n,i)}$ where $\pi(i)$ denotes the symbol $s_{\pi(i)}$ selected for detection during the ith iteration. Hence, $$\Psi^{(n,i+1)} = [H(I_P - R^{(n,i)2}) \Lambda H^H + \sigma^2 I_Q]^{-1}$$
$$= [H(I_P - R^{(n,i-1)2}) \Lambda H^H + \sigma^2 I_Q + H(-\Delta R^{(n,i)2}) \Lambda H^H]^{-1}$$

where the change from $R^{(n,i-1)2}$ to $R^{(n,i)2}$ has been separated out as the matrix $\Delta R^{(n,i)2}$ which has a single $(\pi(i),\pi(i))$ diagonal element $\rho_{\pi(i)}^{(n,i)2} - \rho_{\pi(i)}^{(n,i-1)\,2}$. Further, the first terms on the right side are the inverse of $\Psi^{(n,i)}$, so $$\Psi^{(n,i+1)} = [[\Psi^{(n,i)}]^{-1} + H(-\Delta R^{(n,i)2})\Lambda H^H]^{-1}$$

And the single nonzero element structure of $\Delta R^{(n,i)2}$ allows the matrix products of the second term on the right to be expressed as a tensor product of two vectors:

$$H(-\Delta R^{(n,i)2}) \Lambda H^H = (\rho_{\pi(i)}^{(n,i-1)2} - \rho_{\pi(i)}^{(n,i)2})\lambda_{\pi(i)} h_{\pi(i)} h_{\pi(i)}^H$$
$$= \Delta \rho_{\pi(i)} h_{\pi(i)} h_{\pi(i)}^H$$

where $(\rho_{\pi(i)}^{(n,i-1)2} - \rho_{\pi(i)}^{(n,i)2})\lambda_{\pi(i)}$ has been abbreviated as $\Delta \rho_{\pi(i)}$. Thus $$\Psi^{(n,i+1)} = [[\Psi^{(n,i)}]^{-1} + \Delta\rho_{\pi(i)} h_{\pi(i)} h_{\pi(i)}^H]^{-1}$$

Now applying the matrix inversion lemma yields:

$$\Psi^{(n,i+1)} = \Psi^{(n,i)} - \Psi^{(n,i)} h_{\pi(i)} [h_{\pi(i)}^H \Psi^{(n,i)} h_{\pi(i)} + 1/\Delta\rho_{\pi(i)}]^{-1} h_{\pi(i)}^H \Psi^{(n,i)}$$

which has converted the Q×Q matrix inversion into a 1×1 matrix inversion (i.e., just numerical reciprocal) due to the structure of $h_{\pi(i)} h_{\pi(i)}^H$ as a tensor product of Q×1 matrices (vectors). In short, $h_{\pi(i)}^H \Psi^{(n,i)} h_{\pi(i)} + 1/\Delta\rho_{\pi(i)}$ is a scalar. Consequently, the recursion:

$$\Psi^{(n,i+1)} = \Psi^{(n,i)} - \Psi^{(n,i)} h_{\pi(i)} h_{\pi(i)}^H \Psi^{(n,i)} / [h_{\pi(i)}^H \Psi^{(n,i)} h_{\pi(i)} + 1/\Delta\rho_{\pi(i)}]$$

has no matrix inversions beyond the initial $\Psi^{(1,0)} = [H\Lambda H^H + \sigma^2 I_Q]^{-1}$.

And the SINR can also be expressed in terms of $\Psi^{(n,i)}$ as $$\gamma_p^{(n,i+1)} = \lambda_p h_p^H (\Psi^{(n,i)} - \Psi^{(n,i)} h_{\pi(i)} h_{\pi(i)}^H \Psi^{(n,i)} / D) h_p$$

where $D = \lambda_p^{-1}(1 - \rho_{\pi(i)}^{(n,i)2})^{-1} - h_p^H \Psi^{(n,i)} h_p$. Hence, the foregoing preferred embodiment could be cast in terms of $\Psi^{(n,i)}$ with the foregoing updating.

The analogous analysis for $\Phi^{(n,i)}$ follows similar lines:

$$\Phi^{(n,i+1)} = [H^H H (I_P - R^{(n,i)2}) + \sigma^2 \Lambda^{-1}]^{-1}$$
$$= [[\Phi^{(n,i)}]^{-1} + H^H H \Delta R^{(n,i)2}]^{-1}$$

and again the single nonzero element structure of $\Delta R^{(n,i)2}$ allows the matrix product $H^H H \Delta R^{(n,i)2}$ to be expressed as a constant times the tensor product of two vectors:

$\Delta\rho_{\pi(i)}(H^H H)_{\pi(i)} 1_{\pi(i)}^H$ where $(H^H H)_{\pi(i)}$ is the $\pi(i)$ column P-vector of $H^H H$ and $1_{\pi(i)}$ is the column P-vector with all components equal to 0 except the $\pi(i)$th component. Note that here $\Delta\rho_{\pi(i)} = \rho_{\pi(i)}^{(n,i-1)2} - \rho_{\pi(i)}^{(n,i)2}$.

Then the matrix inversion lemma yields the recursion:

$$\Phi^{(n,i+1)} = \Phi^{(n,i)} - \Phi^{(n,i)} (H^H H)_{\pi(i)} 1_{\pi(i)}^H \Phi^{(n,i)} / [1_{\pi(i)}^H \Phi^{(n,i)} (H^H H)_{\pi(i)} + 1/\Delta\rho_{\pi(i)}]$$

and again there are no matrix inversions beyond the initial $[H^H H + \sigma^2 \Lambda^{-1}]^{-1}$. Further, this updating of $\Phi^{(n,i)}$ could be used in the SINR computations.

Note that the foregoing updating method without matrix inversions would also apply to methods in which changes occur in more than one value of the correlation coefficients, such as in various iterated-decision LMMSE methods. Multiple single value recursions can be performed to achieve to update multiple changes, where each recursion is used to update one change.

6. Decision Alternatives

The foregoing preferred embodiments hard decision method D (which converts $z_{\pi(i)}^{(n,i)}$ into $\hat{s}_{\pi(i)}^{(n,i)}$) uses a maximum likelihood approach that applies a hard-limiter (hard-clipping) non-linearity. Alternative preferred embodiment non-linearities, such as hyperbolic tangent and soft linear clipping, may result in better performance. They can be described mathematically as follows for BPSK:

Hyperbolic tangent: $D(z) = \tanh(\text{Re}\{z\}/\xi)$

Soft linear clipped:

$$D(z) = +1 \quad \text{if } \text{Re}\{z\} > \xi$$
$$= -1 \quad \text{if } \text{Re}\{z\} < -\xi$$
$$= \text{Re}\{z\} \quad \text{if } |\text{Re}\{z\}| \leq \xi$$

where $\xi$ is a non-negative constant. For higher order modulation, the decision is done in the bit level following the bit log likelihood ratio computation (as described in Section 7). Alternatively, for QPSK, the real and imaginary parts of: $D(z)$ can be taken as $\tanh(\text{Re}\{z\}/\xi)$ and $\tanh(\text{Im}\{z\}/\xi)$, respectively; or the corresponding soft linear with $\text{Re}\{z\}$ and $\text{Im}\{z\}$, respectively. Further, for higher order (larger constellations) the soft linear extends by selecting the constant to make $D(z) = z$ for z in the constellation.

In these cases the decision statistics that are close to zero are effectively scaled instead of clipped; the scaling depends upon the variance of the residual interference plus noise. Use the same cancellation (interference subtraction) with these hard decisions defining the $\hat{s}_k^{(n,i)}$.

7. Decoding

The demodulator converts the soft symbol estimates $z_{\pi(1)}^{(N,1)}, z_{\pi(2)}^{(n,2)}, \ldots, z_{\pi(P)}^{(N,P)}$ output by an N-stage detector into conditional probabilities; and the conditional probabilities translate into bit-level log likelihood ratios (LLRs) for (sequence) decoding. In more detail, the LLRs in terms of the bits $u_{pk}$ which define the constellation symbol $s_p$ (e.g., two bits for a QPSK symbol, four bits for a 16QAM symbol, etc.) are defined (dropping the superscripts on the $z_p$) as $$LLR(u_{pk}) = \log\{P[u_{pk} = 1|z_p] / P[u_{pk} = 0|z_p]\}$$

-continued $$= \log\{P[u_{pk} = 1|z_p]\} - \log\{P[u_{pk} = 0|z_p]\}$$

The LLRs can be computed using a channel model. For example, $$LLR(u_{pk}) = \log\{P[u_{pk} = 1|z_p]/P[u_{pk} = 0|z_p]\}$$
$$= \log\{p(z_p|u_{pk} = 1)/p(z_p|u_{pk} = 0)\} +$$
$$\log\{P[u_{pk} = 1]/P[u_{nk} = 0]\}$$

where the first log term includes the probability distribution of the demodulated symbol $z_p$ which can be computed using the channel model. The second log term is the log of the ratio of a priori probabilities of the bit values and typically equals 0. So for an AWGN channel where the residual interference (interference which is not cancelled) is also a zero-mean, normally-distributed, independent random variable, the channel model gives:

$$p(z_p|s_p=c) \sim \exp(-|z_p-c|^2/\gamma_p)$$

where c is a symbol in the symbol constellation and $\gamma_p$ is a normalization typically derived from the channel characteristics and the detector type. Of course, $\gamma_p$ is just twice the variance of the estimation error random variable.

Then compute LLRs by using an approximation which allows direct application of the channel model. Take $p(z_p|u_{pk}=1)=p(z_p|s_p=c_{pk=1})$ where $c_{pk=1}$ is the symbol in the sub-constellation of symbols with kth bit equal 1 and which is the closest to $z_p$; that is, $c_{pk=1}$ minimizes $|z_p-c_{k=1}|^2$ for $c_{k=1}$ a symbol in the sub-constellation with kth bit equal to 1. Analogously for $p(z_p|u_{pk}=0)$ using the sub-constellation of symbols with kth bit equal 0. Then with equal a priori probabilities of the bit values and the notation subscript k=1 and k=0 indicating symbols with kth bit 1 and 0, respectively, the approximation yields $$LLR(u_{pk}) = \log\{p(z_p|u_{pk} = 1)/p(z_p|u_{pk} = 0)\}$$
$$\cong 1/\gamma_p\{\min_{k=0}|z_p - c_{k=0}|^2 - \min_{k=1}|z_p - c_{k=1}|^2\}$$

Thus the LLR computation just searches over the two symbol sub-constellations for the minima.

The LLRs are used in decoders for error correcting codes such as Turbo codes (e.g., iterative interleaved MAP decoders with BCJR or SOVA algorithm using LLRs for each MAP) and convolutional codes (e.g. Viterbi decoders). Such decoders require soft bit statistics (in terms of LLR) from the detector to achieve their maximum performance (hard bit statistics with Hamming instead of Euclidean metrics can also be used but result in approximately 3 dB loss). Alternatively, direct symbol decoding with LLRs as the conditional probability minus the a priori probability could be used 8. Simulation Results Simulations for 4×4 MIMO QPSK and 16QAM systems in uncorrelated (IID) MIMO channels were performed to compare a preferred embodiment with other detection methods. In particular, the comparison included a preferred embodiment method, a linear MMSE, an iterative MMSE with optimal SINR-based detection ordering (similar to the first stage of a preferred embodiment with correlations either 0 or 1), and an iterated-decision linear MMSE as in Chen and Wornell (see background) using five stages to achieve convergence.

Figure 3A:
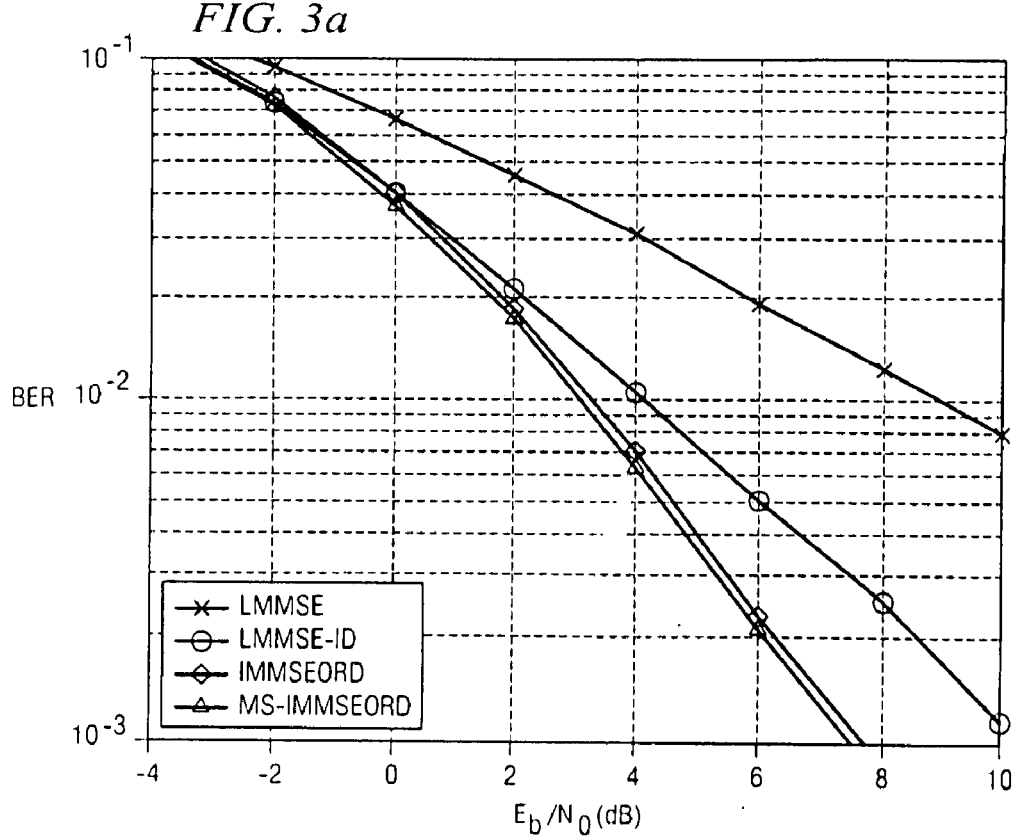
FIGS. 3a-3b simulation results.
Figure 3B:
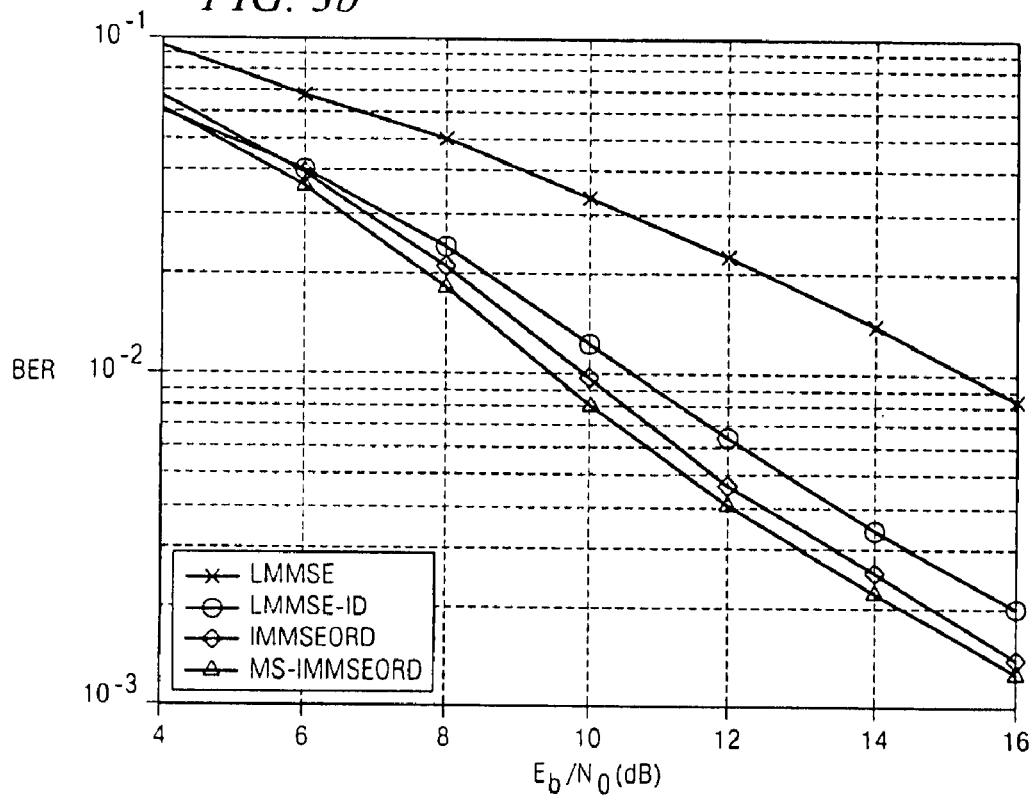

FIGS. 3a-3b illustrate the raw BER versus $E_b/N_0$ results. The following table expresses the performance of a 2-stage preferred embodiment relative to the 5-stage iterated-decision linear MMSE and the iterative MMSE with optimal SINR detection in terms of $E_b/N_0$ (dB) required to achieve a BER of 0.01:

| Method | (4,4) QPSK | (4,4) 16QAM |
|---|---|---|
| Iterative MMSE/optimal SINR | 3.3 | 10/0 |
| 5-stage iterative decision | 4.2 | 10.7 |
| 2-stage preferred embodiment | 3.1 | 9.5 |

The preferred embodiments show considerable gain with 2 stages relative to the iterative MMSE with optimal SINR which is roughly comparable to a preferred embodiment with only 1 stage. The implementation preferred embodiments of section 5 allow inclusion of additional stages with small complexity increase. Note that the implementations of section 5 may also be applied to updates in the iterative-decision methods.

9. Modifications

The preferred embodiments may be varied while retaining one or more of the features of stages of detections with each detection using optimal SINR and cancellation with correlation-weighted current hard decisions.

For example, a sub-optimal alternative to the correlation weighting is to choose a set of pre-determined weighting coefficients, which do not depend on the channel, but increase as the number of iterations and/or stages increase. Also, a stage may be terminated prior to completion and the then-current decoding used, so some symbol estimates would be from the current stage and some from the prior stage.

What is claimed is:

1. A multistage iterative minimum mean square error detection method for a multiple-input, multiple-output (MIMO) communications system, comprising the steps of:
    (a) receiving Q samples at Q receive antennas of P symbols transmitted from P transmit antennas of a remote transmitter, where P is an integer greater than 1 and Q is an integer not less than P;
    (b) iteratively first detecting each of said P symbols using said Q samples wherein each of said first detections is a minimum mean square error detection including cancellation of symbols detected in prior iterations of said first detections; and
    (c) after step (b), iteratively second detecting ones of said P symbols using said Q samples wherein each of said second detections is a minimum mean square error detection including cancellation of said symbols detected in either prior iterations of said second detections or in said first detections.

2. The method of claim 1, wherein:
    (a) said second detections have the form $F^{(i)} r - G^{(i)} \hat{s}^{(i-1)}$ where i is an iteration index, r is a Q-vector of received samples, $F^{(i)}$ is a normalized product of an equalization matrix and a matched filter matrix, $G^{(i)}$ is a cancellation matrix, and $\hat{s}^{(i-1)}$ is a P-vector of hard decisions on said symbols detected in either prior iterations of said second detections or in said first detections.

3. The method of claim 2, wherein:

(a) said $F^{(i)}$ and $G^{(i)}$ are found by maximizing the signal-to-interference-plus-noise ratios of said symbols.

4. The method of claim 2, wherein:

(a) said matrix $F^{(i)}$ has the form $D\Phi^{(i)} H^H$ where D is a diagonal matrix normalizing the diagonal terms of $F^{(i)}$, $\Phi^{(i)}$ is a P×P equalization matrix, and $H^H$ is the Hermitian conjugate of the Q×P channel matrix for the channel from the P sources to the Q sinks.

5. The method of claim 4, wherein:

(a) said P×P equalization matrix $\Phi^i$ is found by a matrix-inversion-free recursion using $\Phi^{(i-1)}$.

6. The method of claim 2, wherein:

(a) the matrix $F^{(i)}$ has the form $D H^H \Psi^i$ where D is a diagonal matrix normalizing the diagonal terms of $F^{(i)}$, $\Psi^{(i)}$ is a Q×Q equalization matrix, and $H^H$ is the Hermitian conjugate of the Q×P channel matrix for the channel from the P sources to the Q sinks.

7. The method of claim 6, wherein:

(a) said P×P equalization matrix $\Psi^{(i)}$ is found by a matrix-inversion-free recursion using $\Psi^{(i-1)}$.

8. The method of claim 3, wherein:

(a) the matrix $G^{(i)}$ has the form $G^{(i)}=(F^{(i)}H-I_F)R^{(i-1)}$ where H is the Q×P channel matrix for the channel from the P sources to the Q sinks and $R^{(i-1)}$ is a correlation matrix of correlations of symbols and their hard decision estimates available in iteration i−1.

9. The method of claim 8, wherein (a) the elements of said correlation matrix $R^{(i-1)}$ of claim 8 are found from said signal-to-interference-plus-noise ratio together with said hard decision method and a normal approximation for residual interference plus noise.

10. The method of claim 8, wherein:

(a) the elements of said correlation matrix $R^{(i-1)}$ of claim 8 are found from pilot symbols and ensemble averaging.

11. The method of claim 2, wherein:

(a) said hard decision vector $\hat{s}^{(i)}$ of claim 2 is computed by $\hat{s}_k^{(i)}=D(z_k^{(i)})$ where $z=F^{(i)} r-G^{(i)}\hat{s}^{(i-1)}$ and $D(z)$ is defined as the symbol of a constellation which minimizes the distance from $D(z)$ to z.

12. The method of claim 2, wherein:

(a) said hard decision vector $\hat{s}^{(i)}$ of claim 2 is computed by $\hat{s}_k^{(i)}=D(z_k^{(i)})$ where $z=F^{(i)}r-G^{(i)} \hat{s}^{(i-1)}$ and $D(z)$ is defined as $\tanh(\text{Re}\{z\}/c)$ for symbols z with ±1 values where c is a non-negative constant and an extension on the bit level for symbols represented with multiple bits.

13. The method of claim 1, further comprising:

(a) after step (c) of claim 1, iteratively third detecting each of said P symbols wherein each of said third detections is a minimum mean square error detection and includes cancellation of previously-detected ones of said symbols including results of step (c) of claim 1.

14. The method of claim 1, wherein:

(a) said P symbols are transmitted from P antennas; and (b) said Q samples are received from Q antennas.

15. An iterative minimum mean square error detection method for a multiple-input, multiple-output (MIMO) communications system, comprising the steps of:

(a) receiving Q samples at Q receive antennas of P symbols transmitted from P transmit antennas of a remote transmitter, where P is an integer greater than 1 and Q is an integer not less than P;

(b) iteratively detecting each of said P symbols wherein each of said detections is a minimum mean square error detection using said Q samples including cancellation of previously-detected ones of said symbols; and (c) wherein said detections have the form $F^{(i)} r-G^{(i)} \hat{s}^{(i-1)}$ where i is an iteration index, r is a Q-vector of received samples, $F^{(i)}$ is a normalized product of an equalization matrix and a matched filter $H^H$ where H is a Q×P channel matrix, $G^{(i)}$ is a cancellation matrix, and $\hat{s}^{(i-1)}$ is a P-vector of hard decisions on previously-detected symbols; and (d) wherein said equalization matrix for iteration i is found by a matrix-inversion-free recursion using said equalization for iteration i−1.

16. The method of claim 15, wherein:

(a) said $F^{(i)}$ and $G^{(i)}$ are found by maximizing the signal-to-interference-plus-noise ratios of the symbols.

17. The method of claim 15, wherein:

(a) the matrix $F^{(i)}$ has the form $D\Phi^{(i)} H^H$ where D is a diagonal matrix normalizing the diagonal terms of $F^{(i)}$ and $\Phi^{(i)}$ is a P×P equalization matrix.

18. The method of claim 17, wherein:

(a) said P×P equalization matrix $\Phi^{(i)}$ is found by a matrix-inversion-free recursion using $\Phi^{(i-1)}$ with $\Phi^{(o)}=[H^H H+\sigma^2 \Lambda^{-1}]^{-1}$ where $\sigma^2$ is the variance of the channel noise and Λ is a diagonal matrix of transmitted symbol energies.

19. The method of claim 15, wherein:

(a) the matrix $F^{(i)}$ has the form $D H^H \Psi^{(i)}$ where D is a diagonal matrix normalizing the diagonal terms of $F^{(i)}$ and $\Psi^i$ is a Q×Q equalization matrix.

20. The method of claim 19, wherein:

(a) said P×P equalization matrix $\Psi^{(i)}$ is found by a matrix-inversion-free recursion using $\Psi^{(i-1)}$ with $\Psi^{(0)}=[H \Lambda H^H+\sigma^2 I_Q]^{-1}$ where $\sigma^2$ is the variance of the channel noise and Λ is a diagonal matrix of transmitted symbol energies.

* * * * *